(12) United States Patent
Lee

(10) Patent No.: US 10,135,274 B2
(45) Date of Patent: Nov. 20, 2018

(54) CHARGING CIRCUIT AND ELECTRONIC DEVICE HAVING THE SAME

(71) Applicant: Samsung Electronics Co., Ltd., Gyeonggi-do (KR)

(72) Inventor: Kisun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 246 days.

(21) Appl. No.: 14/613,226

(22) Filed: Feb. 3, 2015

(65) Prior Publication Data

US 2015/0222135 A1 Aug. 6, 2015

(30) Foreign Application Priority Data

Feb. 3, 2014 (KR) ........................ 10-2014-0012312

(51) Int. Cl.
    *H02M 3/158* (2006.01)
    *H02J 7/00* (2006.01)
    *H02M 3/07* (2006.01)
    *H02M 1/00* (2006.01)

(52) U.S. Cl.
    CPC .......... *H02J 7/0052* (2013.01); *H02J 7/0044* (2013.01); *H02M 3/158* (2013.01); *H02J 2007/0059* (2013.01); *H02M 3/07* (2013.01); *H02M 2001/007* (2013.01)

(58) Field of Classification Search
    CPC .................................................. H02J 7/0052
    USPC ....................................................... 320/107
    See application file for complete search history.

(56) References Cited

U.S. PATENT DOCUMENTS

| | | | |
|---|---|---|---|
| 6,803,746 B2 | 10/2004 | Aker et al. | |
| 7,102,405 B2* | 9/2006 | Hisamoto | ............... H03F 3/217 |
| | | | 327/172 |
| 7,476,987 B2 | 1/2009 | Chang | |

(Continued)

FOREIGN PATENT DOCUMENTS

| | | |
|---|---|---|
| CN | 101765962 A | 6/2010 |
| CN | 102820781 A | 12/2012 |

(Continued)

OTHER PUBLICATIONS

International Search Report dated Apr. 29, 2015 in connection with International Patent Application No. PCT/KR2015/000877, 3 pages.

(Continued)

*Primary Examiner* — Drew A Dunn
*Assistant Examiner* — Jerry D Robbins

(57) ABSTRACT

A charging circuit for charging a battery of an electronic device includes a first switch having one side connected to an interface into which external power is input, a second switch having one side connected to the other side of the first switch, a third switch having one side connected to the other side of the second switch, a fourth switch having one side connected to the other side of the third switch, a flying capacitor located between the other side of the first switch and the other side of the third switch, an inductor having one side connected to the other side of the second switch, and a control circuit for controlling a charging function of the battery by controlling on/off of the first switch, the second switch, the third switch and the fourth switch.

19 Claims, 6 Drawing Sheets

(56) References Cited

U.S. PATENT DOCUMENTS

| | | | | |
|---|---|---|---|---|
| 8,427,113 B2* | 4/2013 | Xing | ................ | H02J 7/0065 |
| | | | | 320/140 |
| 8,627,121 B2* | 1/2014 | Wu | ................ | H02J 7/0031 |
| | | | | 713/300 |
| 9,203,309 B2* | 12/2015 | Hawawini | ............ | H02M 3/158 |
| 9,312,767 B2* | 4/2016 | Sandner | ............... | H02M 3/158 |
| 9,430,008 B2* | 8/2016 | Li | ............................ | G06F 1/26 |
| 2008/0157723 A1* | 7/2008 | Xing | ................ | H02J 7/022 |
| | | | | 320/164 |
| 2008/0239772 A1 | 10/2008 | Oraw et al. | | |
| 2009/0033293 A1* | 2/2009 | Xing | ................ | H02J 7/0077 |
| | | | | 320/164 |
| 2011/0018511 A1* | 1/2011 | Carpenter | ............ | H02M 3/158 |
| | | | | 323/282 |
| 2012/0218032 A1 | 8/2012 | Nadimpalli | | |

FOREIGN PATENT DOCUMENTS

| | | |
|---|---|---|
| JP | 2010017013 A | 1/2010 |
| JP | 2010063267 A | 3/2010 |
| WO | WO 2012/074967 A1 | 6/2012 |

OTHER PUBLICATIONS

Extended European Search Report dated May 28, 2015 in copnnection with European Patent Application No. 15153038.3; 6 pages.
Office Action dated Jul. 9, 2018 in connection with Chinese Patent Application No. 201510053567.X.

* cited by examiner

CHARGING CIRCUIT AND ELECTRONIC DEVICE HAVING THE SAME

CROSS-REFERENCE TO RELATED APPLICATION AND CLAIM OF PRIORITY

The present application is related to and claims priority from and the benefit under 35 U.S.C. § 119(a) of Korean Patent Application No. 10-2014-0012312, filed on Feb. 3, 2014, which is hereby incorporated by reference for all purposes as if fully set forth herein.

TECHNICAL FIELD

The present disclosure relates generally to a charging circuit of an electronic device which can improve a charging efficiency by reducing power loss.

BACKGROUND

On the strength of the recent remarkable developments in information communication technologies and semiconductor technologies, the supply and use of various portable terminals has rapidly increased. Such electronic devices provide various functions which users need. For example, the electronic devices provide various functions such as a mobile communication function, a short-range wireless communication function, a broadcast reception function, an Internet access function and the like.

As the electronic devices provide various functions, interest in battery lifetime has increased. The number of electronic devices providing a high capacity battery has increased in order to increase use time of the electronic device. According to an increase in battery capacity, battery charging time may also increase.

SUMMARY

A conventional electronic device provides a high current charging scheme to reduce battery charging time. However, capacities and sizes of internal components may increase in order to charge at a high current. Further, the high current charging scheme has a problem in that charging efficiency is poor and product life is reduced due to heating.

To address the above-discussed deficiencies, it is a primary object to provide a charging circuit of an electronic device which can increase charging efficiency by reducing power loss.

In accordance with an aspect of the present disclosure, a charging circuit for charging a battery of an electronic device is provided. The charging circuit includes: a first switching element having one side connected to an interface into which external power is input; a second switching element having one side connected to the other side of the first switching element; a third switching element having one side connected to the other side of the second switching element; a fourth switching element having one side connected to the other side of the third switching element; a flying capacitor located between the other side of the first switching element and the other side of the third switching element; an inductor having one side connected to the other side of the second switching element; and a control circuit for controlling a charging function of the battery by controlling on/off of the first switching element, the second switching element, the third switching element and the fourth switching element.

In accordance with another aspect of the present disclosure, an electronic device is provided. The electronic device includes: a battery; and a charging circuit for charging the battery, wherein the charging circuit includes: a first switching element having one side connected to an interface into which external power is input; a second switching element having one side connected to the other side of the first switching element; a third switching element having one side connected to the other side of the second switching element; a fourth switching element having one side connected to the other side of the third switching element; a flying capacitor located between the other side of the first switching element and the other side of the third switching element; an inductor having one side connected to the other side of the second switching element; and a control circuit for controlling a charging function of the battery by controlling on/off of the first switching element, the second switching element, the third switching element and the fourth switching element.

A charging circuit of an electronic device according to various embodiments of the present disclosure can minimize power loss when charging is performed. For example, a charging circuit according to various embodiments of the present disclosure can prevent a heating problem by minimizing power loss when high voltage or high current charging is performed.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
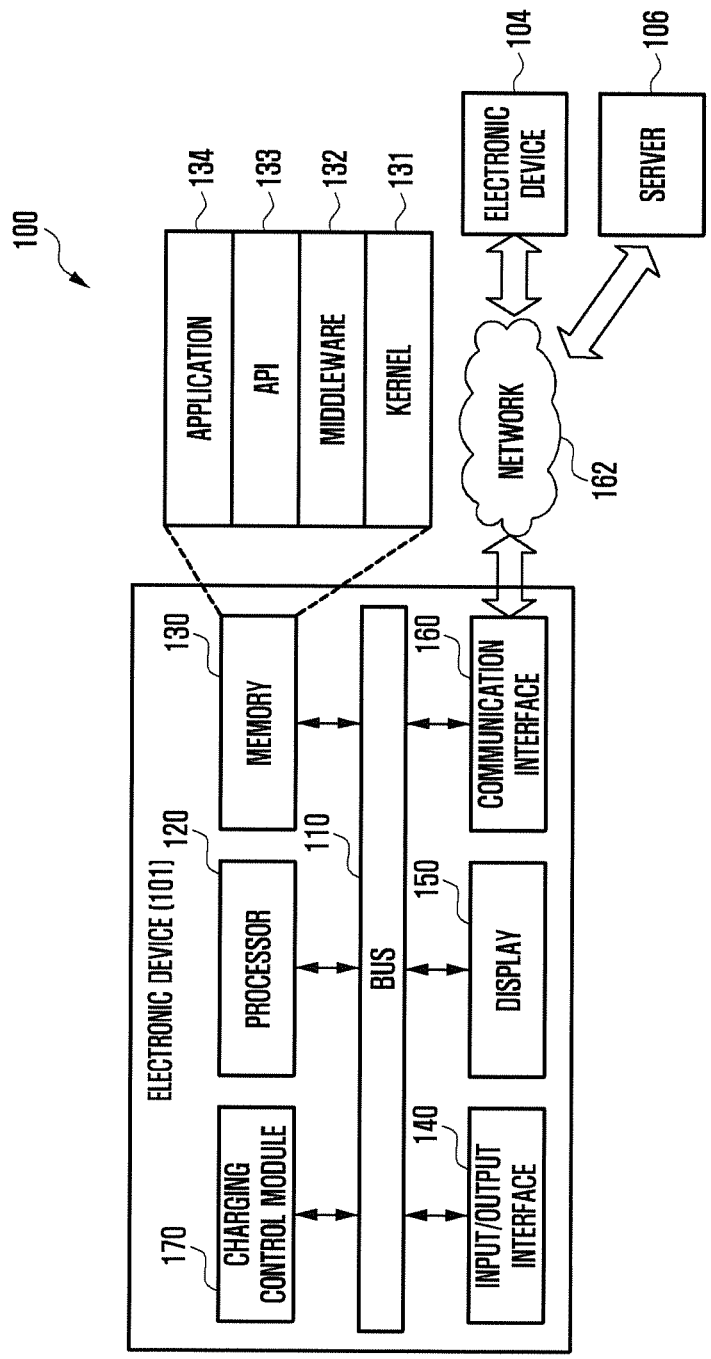
FIG. 1 illustrates a network environment including an electronic device according to various embodiments of the present disclosure.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic technologies. Hereinafter, various embodiments of the present disclosure will be described with reference to the accompanying drawings. Specific embodiments are shown in the drawings and the relevant detailed descriptions are given in corresponding sections, but there is no intention to limit various embodiments of the present disclosure to the particular forms disclosed herein. For example, the present disclosure may have various embodiments while modifications and changes may be made therein. Various embodiments of the present disclosure should be construed to cover all modifications, equivalents, and/or alternatives falling within the spirit and scope of the present disclosure.

In the description of the drawings, identical or similar reference numerals are used to designate identical or similar elements.

As used in various embodiments of the present disclosure, the expressions "include", "may include" and other conjugates refer to the existence of a corresponding disclosed function, operation, or constituent element, and do not limit one or more additional functions, operations, or constituent elements.

In the present disclosure, the terms such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the present disclosure includes any or all of combinations of listed words. For example, the expression "A or B" may include A, may include B, or may include both A and B.

The expressions such as "first", "second", or the like used in various embodiments of the present disclosure may modify various component elements in the various embodiments but may not limit corresponding component elements. For example, the above expressions do not limit the sequence and/or importance of the corresponding elements. The above expressions may be used merely for the purpose of distinguishing one element from the other elements. For example, a first user device and a second user device indicate different user devices although both of them are user devices. For example, without departing from the scope of the present disclosure, a first component element may be named a second component element. Similarly, the second component element also may be named the first component element.

When an element is referred to as being "coupled" or "connected" to any other element, it should be understood that not only the element may be directly couple4d or connected to the other element, but also a third element may be interposed therebetween. Contrarily, when an element is referred to as being "directly coupled" or "directly connected" to any other element, it should be understood that no element is interposed therebetween.

The terms as used in embodiments of the present disclosure are used to describe a specific embodiment, and are not intended to limit the present disclosure. As used herein, the singular forms are intended to include the plural forms as well, unless the context clearly indicates otherwise.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of the art, and are not to be interpreted to have ideal or excessively formal meanings unless clearly defined in the present disclosure.

Electronic devices according to various embodiments of the present disclosure may be devices adopting a communication function. For example, the electronic device may include at least one of a smartphone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MP3 player, a mobile medical appliance, a camera, and a wearable device (e.g. a Head-Mounted-Device (HMD) such as electronic glasses, electronic clothes, an electronic bracelet, an electronic necklace, an electronic appcessory, electronic tattoos, or a smartwatch).

According to some embodiments, an electronic device may be a smart home appliance with a communication function. The smart home appliances may include at least one of, for example, televisions, digital video disk (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames.

According to some embodiments, the electronic device may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) of a shop.

According to some embodiments, the electronic devices may include at least one of furniture or a part of a building/structure having a communication function, electronic boards, electronic signature receiving devices, projectors, or various measuring equipment (e.g., equipment for a water supply, an electricity, gases or radio waves).

An electronic device according to various embodiments of the present disclosure may be a combination of one or more of above described various devices. Also, an electronic device according to various embodiments of the present disclosure may be a flexible device. Also, an electronic device according to various embodiments of the present disclosure is not limited to the above described devices.

Hereinafter, an electronic device according to various embodiments of the present disclosure will be described with reference to the accompanying drawings. As used in various embodiments, the term "user" may indicate a person using an electronic device or a device (e.g., an artificial intelligence electronic device) using an electronic device.

FIG. 1 illustrates a network environment 100 including an electronic device 101 according to various embodiments of the present disclosure.

Referring to FIG. 1, the electronic device 101 can include a bus 110, a processor 120, a memory 130, an input/output interface 140, a display 150, a communication interface 160, and a charging control module 170.

The bus 110 can be a circuit connecting the aforementioned components and transmitting communication (for example, a control message) between the aforementioned components.

For example, the processor 120 can receive instructions from the aforementioned other components (for example, the memory 130, the input/output interface 140, the display, the communication interface 160, or the charging control module 170) through the bus 110, decipher the received instructions, and perform calculation or data processing according to the deciphered instructions.

The memory 130 can store instructions or data received from or created by the processor 120 or other components for (example, the input/output interface 140, the display 150, the communication interface 160, or the charging control module 170). The memory 130 can include programming modules, for example, a kernel 132, middleware 132, an Application Programming Interface (API) 133, or applications 134. Each of the programming modules described above can be formed of software, firmware, hardware, or a combination of two or more thereof.

The kernel 131 can control or manage system resources (for example, the bus 110, the processor 120, or the memory 130) used for executing an operation or function implemented in the remaining other programming modules, for example, the middleware 133, the API 133, or the applications 134. Further, the kernel 131 can provide an interface which can access and control or manage the individual components of the electronic device 101 through the middleware 132, the API 133, or the applications 134.

The middleware 132 can perform a relay function of allowing the API 133 or the applications 134 to exchange data through communication with the kernel 131. Further, in regard to task requests received from the applications 134, the middleware 132 can perform a control (for example, scheduling or load balancing) for the task requests by using, for example, a method of assigning a priority, with which the system resources (for example, the bus 110, the processor 120, or the memory 130) of the electronic device 101 can be used, to at least one of the applications 134.

The API 133 is an interface by which the applications 134 can control functions provided by the kernel 131 or the middleware 132, and can include, for example, at least one interface or function (for example, instruction) for file control, window control, image processing, or text control.

According to various embodiments, the applications 134 can include a Short Message Service (SMS)/Multimedia Message Service (MMS) application, an e-mail application, a calendar application, an alarm application, a health care application (for example, an application for measuring an amount of exercise or blood sugar), or an environmental information application (for example, an application for providing an atmospheric pressure, humidity, or temperature information). Additionally or alternatively, the applications 134 can include an application related to an information exchange between the electronic device 101 and an external electronic device (for example, an electronic device 104). The application related to the information exchange can include, for example, a notification relay application for transmitting specific information to the external electronic device, or a device management application for managing the external electronic device.

For example, the notification relay application can include a function of transferring, to the external electronic device (for example, the electronic device 104), notification information generated from other applications of the electronic device 101 (for example, an SMS/MMS application, an e-mail application, a health management application, an environmental information application, and the like). Additionally or alternatively, the notification relay application can receive the notification information from, for example, the external electronic device (for example, the electronic device 104), and can provide the received notification information to a user. The device management application can manage (for example, install, delete, or update), for example, a function (for example, turning on/off the external electronic device itself (or some components thereof) or adjusting brightness (or resolution) of a display) for at least a part of the external electronic device (for example, the electronic device 104) communicating with the electronic device, applications executed in the external electronic device, or services (for example, a telephone call service or a message service) provided from the external electronic device.

According to various embodiments, the applications 134 can include an application set on the basis of an attribute (for example, the type of application) of the external electronic device (for example, the electronic device 104). For example, in a case where the external electronic device 104 is an MP3 player, the applications 134 can include an application related to the reproduction of music. Similarly, in a case where the external electronic device is a mobile medical appliance, the applications 134 can include an application related to health care. According to an embodiment, the applications 134 can include at least one of an application designated to the electronic device 101 and an application received from the external electronic device (for example, a server 106 or the electronic device 104).

The input/output interface 140 can transfer instructions or data input from a user through an input/output device (for example, a sensor, a keyboard, or a touch screen) to, for example, the processor 120, the memory 130, the communication interface 160, or the charging control module 170 through the bus 110. For example, the input/output interface 140 can provide the processor 120 with data for a user's touch input through the touch screen. Further, through the input/output device (for example, a speaker or a display), the input/output interface 140 can output instructions or data received from the processor 120, the memory 130, the communication interface 160, or the charging control module 170 through the bus 110. For example, the input/output interface 140 can output voice data processed through the processor 120 to a user through a speaker. Further, the input/output interface 140 can provide the charging control module 170 with external power input through a charging device, for example, a Travel Adaptor (TA), a USB charger (for example, a notebook, a desktop or the like), or a portable battery charger. In addition, the input/output interface 140 can transmit data input from an external storage device, for example, a USB memory, a USB external hard drive or the like to the processor 120, the memory 130, and the communication interface 160 through, for example, the bus 110 when an On The Go (OTG) function is provided. Alternatively, the input/output interface 140 can transmit data or instructions received from the processor 120, the memory 130, the communication interface 160 or the like to an external storage device through, for example, the bus 110.

The display 150 can display various pieces of information (for example, multimedia data or text data) to a user.

The communication interface 160 can connect communication between the electronic device 101 and the external electronic device (for example, the electronic device 104 or the server 106). For example, the communication interface 160 can be connected to a network 162 through wireless or wired communication to communicate with the external device. The wireless communication can include at least one of, for example, Wi-Fi, Wi-Fi P2P, Bluetooth (BT), Near Field Communication (NFC), Global Positioning System (GPS) and cellular communication (for example, Long Term Evolution (LTE), LTE-A, Code Division Multiple Access (CDMA), Wideband CDMA (WCDMA), Universal Mobile Telecommunication System (UMTS), Wireless Broadband (WiBro), Global System for Mobile communication (GSM), and the like). The wired communication can include at least one of, for example, a Universal Serial Bus (USB), a High Definition Multimedia Interface (HDMI), Recommended Standard 232 (RS-232), and a Plain Old Telephone Service (POTS).

According to an embodiment, the network 162 can be a telecommunication network. The communication network can include at least one of a computer network, the Internet, the Internet of things, and a telephone network. According to an embodiment, a protocol (for example, a transport layer protocol, a data link layer protocol, or a physical layer protocol) for communication between the electronic device 101 and the external device can be supported by at least one of the applications 134, the application programming interface 133, the middleware 132, the kernel 131, and the communication interface 160.

The charging control module 170 can control charging of a battery (not shown). For example, the charging control module 170 can charge a battery by using external power input through an external charging device, for example, a Travel Adaptor (TA), a USB charger (for example, a notebook, a desktop or the like), or a portable battery charger.

Figure 2:
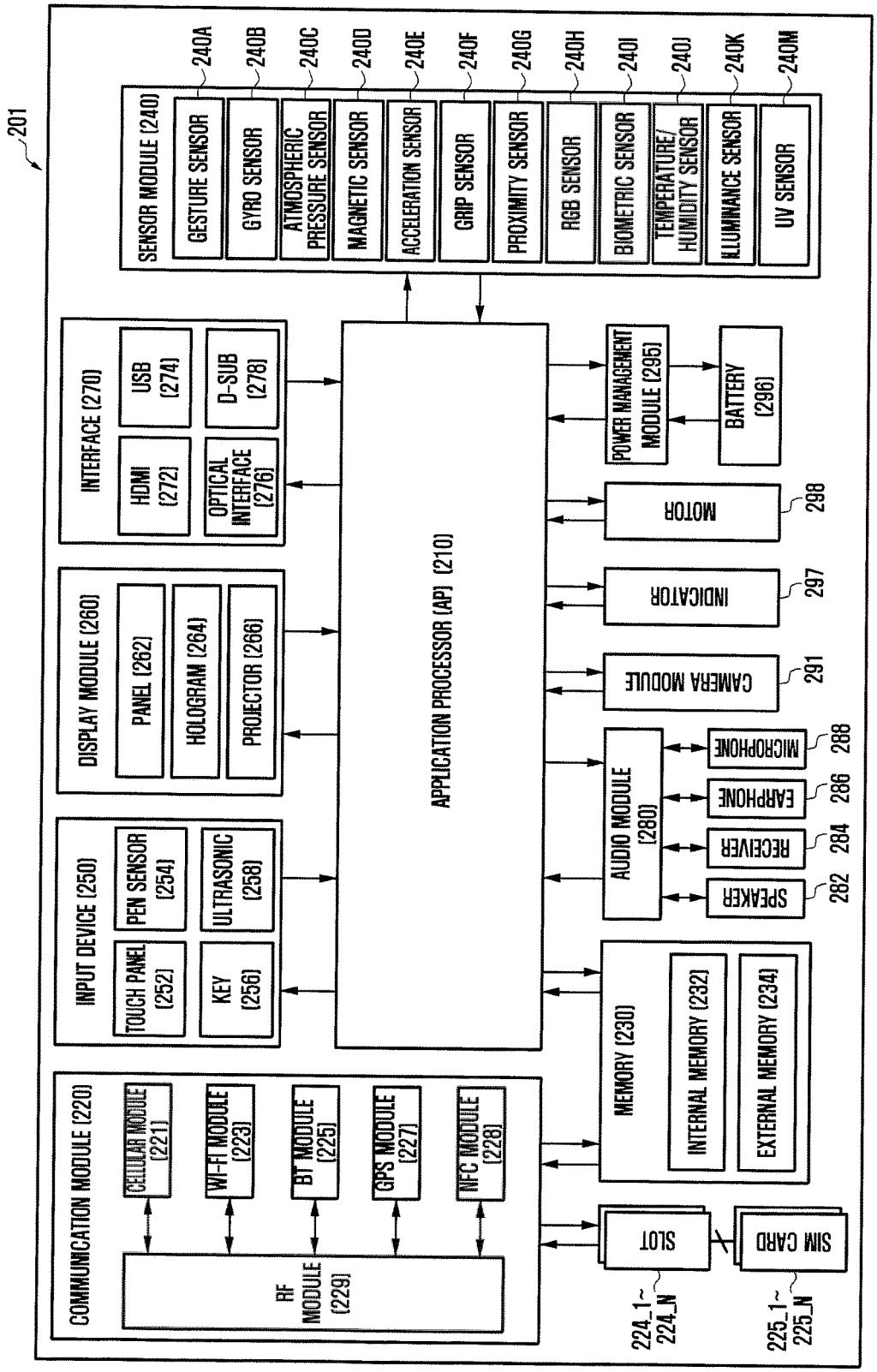
FIG. 2 is a block diagram illustrating a configuration of an electronic device according to various embodiments of the present disclosure.

FIG. 2 is a block diagram of an electronic device 201 according to various embodiments of the present disclosure. The electronic device 201 can include, for example, all or some of the electronic device 101 illustrated in FIG. 1.

Referring to FIG. 2, the electronic device 201 can include one or more Application Processors (APs) 210, a communication module 220, a Subscriber Identifier Module (SIM) card 225_1 to 225_N, a memory 230, a sensor module 240, an input device 250, a display 260, an interface 270, an audio module 280, a camera module 291, a power management module 295, a battery 296, an indicator 297, and a motor 298.

The AP 210 can control a plurality of hardware or software components connected to the AP 210 by driving an operating system or an application program and process various types of data including multimedia data and perform calculations. The AP 210 can be implemented by, for example, a System on Chip (SoC). According to an embodiment, the AP 210 can further include a Graphic Processing Unit (GPU).

The communication module 220 (for example, the communication interface 160) can perform data transmission/reception in communication between the electronic device 201 (for example, the electronic device 101) and other electronic devices (for example, the electronic device 104 or the server 106) connected thereto through a network. According to an embodiment, the communication module 220 can include a cellular module 221, a Wi-Fi module 223, a Bluetooth (BT) module 225, a GPS module 227, an NFC module 228, and a Radio Frequency (RF) module 229.

The cellular module 221 can provide a voice call, a video call, a Short Message Service (SMS), or an Internet service through a communication network (for example, LTE, LTE-A, CDMA, WCDMA, UMTS, WiBro, or GSM). Further, the cellular module 221 can distinguish and authenticate electronic devices within a communication network by using, for example, a subscriber identification module (for example, the SIM card 225_1 to 225_N). According to an embodiment, the cellular module 221 can perform at least some functions which can be provided by the AP 210. For example, the cellular module 221 can perform at least some of the multimedia control functions.

According to an embodiment, the cellular module 221 can include a Communication Processor (CP). Further, the cellular module 221 can be implemented by, for example, an SoC. Although the components such as the cellular module 221 (for example, the communication processor), the memory 230, or the power management module 295 are illustrated to be separated from the AP 210 in FIG. 2, the AP 210 can include at least some of the aforementioned components (for example, the cellular module 221) according to an embodiment.

According to an embodiment, the AP 210 or the cellular module 221 (for example, the communication processor) can load instructions or data received from a non-volatile memory or at least one of other components connected thereto in a volatile memory, and can process the loaded instructions or data. Further, the AP 210 or the cellular module 221 can store data received from or generated by at least one of other components in a non-volatile memory.

The Wi-Fi module 223, the BT module 225, the GPS module 227, and the NFC module 228 can include, for example, a processor for processing data transmitted/received through the corresponding module. In FIG. 2, the cellular module 221, the WiFi module 223, the BT module 225, the GPS module 227, and the NFC module 228 are illustrated as separate blocks, but at least some (for example, two or more) of the cellular module 221, the WiFi module 223, the BT module 225, the GPS module 227, and the NFC module 228 can be included in one Integrated Chip (IC) or one IC package. For example, at least some (for example, the communication processor corresponding to the cellular module 221 and the Wi-Fi processor corresponding to the Wi-Fi module 223) of the processors corresponding to the cellular module 225, the Wi-Fi module 227, the BT module 228, the GPS module 221, and the NFC module 223 can be implemented by one SoC.

The RF module 229 can transmit/receive data, for example, an RF signal. Although not illustrated, the RF module 229 can include, for example, a transceiver, a Power Amplifier Module (PAM), a frequency filter, a Low Noise Amplifier (LNA), or the like. Further, the RF module 229 can further include a component for transmitting/receiving electronic waves over a free air space in wireless communication, for example, a conductor, a conducting wire or the like. Although the cellular module 221, the Wi-Fi module 223, the BT module 225, the GPS module 227, and the NFC module 228 share one RF module 729 in FIG. 2, at least one of the cellular module 221, the Wi-Fi module 223, the BT module 225, the GPS module 227, and the NFC module 228 can transmit/receive an RF signal through a separate RF module according to one embodiment.

The SIM cards 225_1 to 225_N can be cards including a subscriber identification module and can be inserted into slots 224_1 to 224_N formed on a particular portion of the electronic device 201. The SIM card 225 can include unique identification information (for example, Integrated Circuit Card IDentifier (ICCID)) or subscriber information (for example, International Mobile Subscriber Identity (IMSI)).

The memory 230 (for example, the memory 130) can include an internal memory 232 or an external memory 234. The internal memory 232 can include, for example, at least one of a volatile memory (for example, a Dynamic RAM (DRAM), a Static RAM (SRAM), a Synchronous Dynamic RAM (SDRAM), and the like), and a non-volatile Memory (for example, a One Time Programmable ROM (OTPROM), a Programmable ROM (PROM), an Erasable and Programmable ROM (EPROM), an Electrically Erasable and Programmable ROM (EEPROM), a mask ROM, a flash ROM, a NAND flash memory, an NOR flash memory, and the like). According to an embodiment, the internal memory 232 can be a Solid State Drive (SSD). The external memory 234 can further include a flash drive, for example, a Compact Flash (CF), a Secure Digital (SD), a Micro Secure Digital (Micro-SD), a Mini Secure Digital (Mini-SD), an extreme Digital (xD), a memory stick, or the like. The external memory 234 can be functionally connected with the electronic device 201 through various interfaces. According to an embodiment, the electronic device 201 can further include a storage device (or storage medium) such as a hard drive.

The sensor module 240 can measure a physical quantity or detect an operation state of the electronic device 201, and can convert the measured or detected information to an electrical signal. The sensor module 240 can include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, red, green, and blue (RGB) sensor), a biometric sensor 240I, a temperature/humidity sensor 240J, an illumination sensor 240K, and a Ultra Violet (UV) sensor 240M. Additionally or alternatively, the sensor module 240 can include, for example, an E-nose sensor (not illustrated), an electromyography (EMG) sensor (not illustrated), an electroencephalogram (EEG) sensor (not illustrated), an electrocardiogram (ECG) sensor (not illustrated), an Infrared (IR) sensor, an iris sensor (not illustrated), a fingerprint sensor, and the like. The sensor module 240 can further include a control circuit for controlling one or more sensors included in the sensor module 240.

The input device 250 can include a touch panel 252, a (digital) pen sensor 254, a key 256, or an ultrasonic input device 258. The touch panel 252 can recognize a touch input through, for example, at least one of a capacitive type, a resistive type, an infrared type, and an acoustic wave type. Further, the touch panel 252 can further include a control circuit. The capacitive type touch panel can recognize physical contact or proximity. The touch panel 252 can further include a tactile layer. In this case, the touch panel 252 can provide a tactile reaction to the user.

The (digital) pen sensor 254 can be implemented, for example, using a method identical or similar to a method of receiving a touch input of the user, or using a separate recognition sheet. The key 256 can include, for example, a physical button, an optical key, or a keypad. The ultrasonic input device 258 can identify, through an input unit generating an ultrasonic signal, data by detecting an acoustic wave through a microphone (for example, microphone 288) of the electronic device 201 through, and can perform wireless recognition. According to an embodiment, the electronic device 201 can receive a user input from an external device (for example, a computer or a server) connected thereto by using the communication module 220.

The display module 260 (for example, the display 150) can include a panel 262, a hologram device 264, or a projector 266. The panel 262 can be, for example, a Liquid Crystal Display (LCD) or an Active Matrix Organic Light Emitting Diode (AM-OLED). The panel 262 can be implemented to be, for example, flexible, transparent, or wearable. The panel 262 can be configured by the touch panel 252 and one module. The hologram device 264 can show a stereoscopic image in the air by using interference of light. The projector 266 can project light onto a screen to display an image. The screen can be located, for example, inside or outside the electronic device 201. According to an embodiment, the display module 260 can further include a control circuit for controlling the panel 262, the hologram device 264, or the projector 266.

The interface 270 can include, for example, a High-Definition Multimedia Interface (HDMI) 272, a Universal Serial Bus (USB) 274, an optical interface 276, or a D-subminiature (D-sub) 278. The interface 270 can be included in, for example, the communication interface 160 illustrated in FIG. 1. Additionally or alternatively, the interface 270 can include, for example, a Mobile High-definition Link (MHL) interface, a Secure Digital (SD)/Multi-Media Card (MMC) interface, or an Infrared Data Association (IrDA) standard interface. The interface 270 can include, for example, a charging interface. The USB 274 can include a charging and data communication interface. The USB 274 can be used as an OTG interface.

The audio module 280 can bilaterally convert a sound and an electrical signal. At least some components of the audio module 280 can be included in, for example, the input/output interface 140 illustrated in FIG. 1. The audio module 280 can process sound information input or output through, for example, the speaker 286, the receiver 284, the earphones 286, the microphone 288 or the like.

The camera module 291 is a device for capturing a still image or a video. According to an embodiment, the camera module 291 can include one or more image sensors (for example, a front sensor or a rear sensor), a lens (not illustrated), an Image Signal Processor (ISP) (not illustrated), or a flash (not illustrated) (for example, an LED or xenon lamp).

The power management module 295 can manage power of the electronic device 201. Although not illustrated, the power management module 295 can include, for example, a Power Management Integrated Circuit (PMIC), a charger Integrated Circuit (IC), or a battery or fuel gauge.

The PMIC can be mounted within, for example, an integrated circuit or a System on Chip (SoC) semiconductor. Charging methods can be classified into a wired charging method and a wireless charging method. The charger IC can charge a battery and prevent over voltage or over current from flowing from a charger. Further, the charger IC can provide power of the battery 296 to an external storage device when an OTG function is activated.

In some embodiments, the charger IC can include a charger IC for at least one of the wired charging method and the wireless charging method. A magnetic resonance scheme, a magnetic induction scheme, or an electromagnetic scheme can be exemplified as the wireless charging method, and an additional circuit for wireless charging, such as a coil loop circuit, a resonance circuit, a rectifier circuit, and the like can be added.

The battery gauge can measure, for example, a remaining quantity of the battery 296, or a voltage, a current, or a temperature during the charging. The battery 296 can store or generate electricity, and can supply power to the electronic device 201 by using the stored or generated electricity. The battery 296 can include, for example, a rechargeable battery or a solar battery.

The indicator 297 can display a specific status of the electronic device 201 or a part (for example, the AP 210) of electronic device 201, for example, a booting status, a message status, a charging status, and the like. The motor 298 can convert an electrical signal to a mechanical vibration. Although not illustrated, the electronic device 201 can include a processing unit (for example, a GPU) for supporting mobile TV. The processing unit for supporting the mobile TV can process media data according to, for example, a standard of Digital Multimedia Broadcasting (DMB), Digital Video Broadcasting (DVB), media flow or the like.

The above described components of the electronic device according to various embodiments of the present disclosure can be formed of one or more components, and a name of a corresponding component can vary depending on the type of electronic device. The electronic device according to various embodiments of the present disclosure can be configured to include at least one of the above described components, and some of the components can be omitted or additional components can be further included. Further, some of the components of the electronic device according to the various embodiments of the present disclosure can be combined to form a single entity, and thus, can equivalently execute functions of the corresponding elements prior to the combination.

The term "module" used in various embodiments of the present disclosure can refer to, for example, a "unit" including one of hardware, software, and firmware, or a combination of two or more thereof. The "module" can be interchangeable with a term, such as unit, logic, logical block, component, or circuit. The "module" can be a minimum unit of an integrally configured component or a part thereof. The "module" can be a minimum unit for performing one or more functions or a part thereof. The "module" can be mechanically or electronically implemented. For example, the "module" according to various embodiments of the present disclosure can include at least one of an Application-Specific Integrated Circuit (ASIC) chip, a Field-Programmable Gate Arrays (FPGAs), and a programmable-logic device for performing operations which have been known or are to be developed hereafter.

Figure 3:
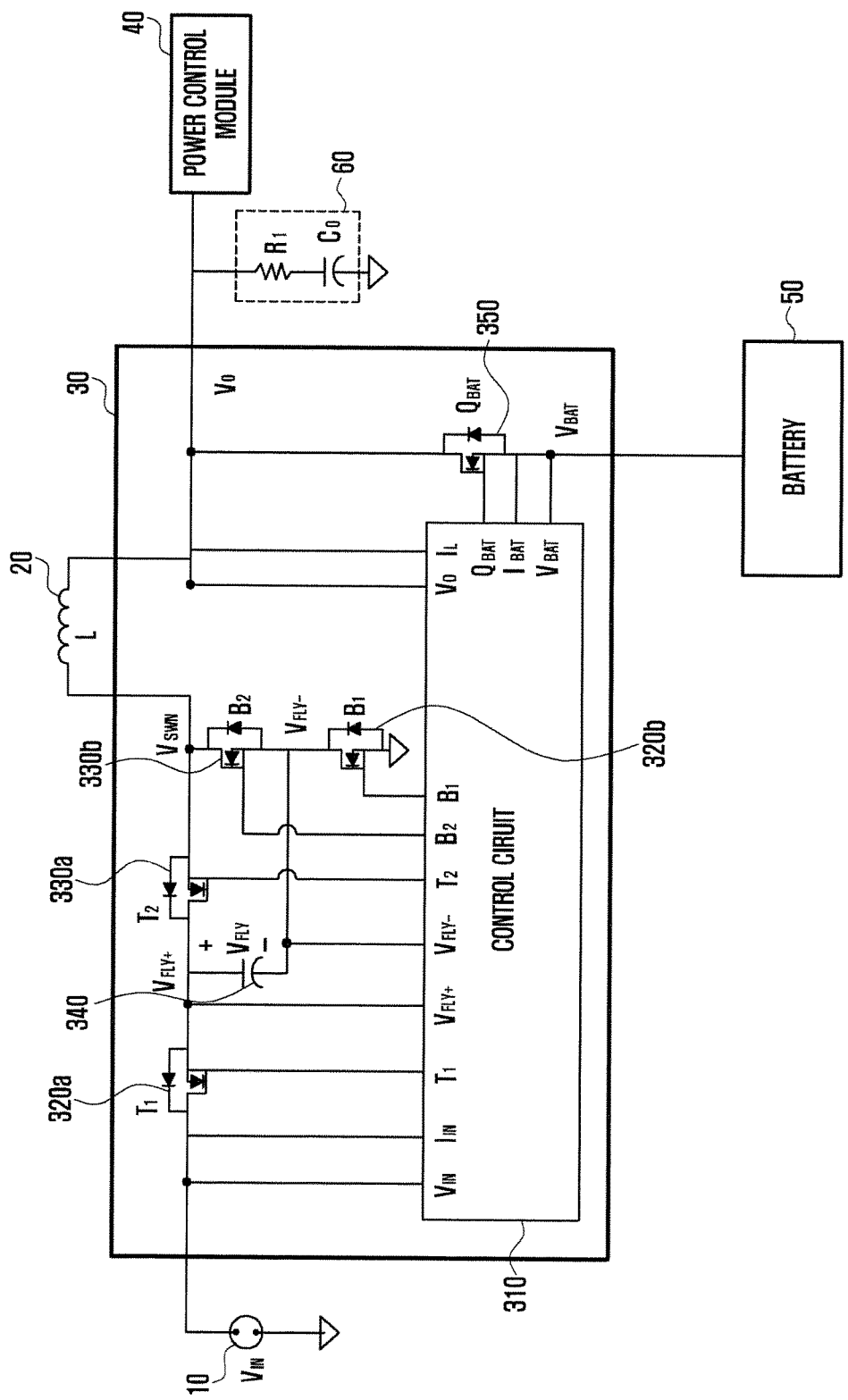
FIG. 3 illustrates a charging system according to various embodiments of the present disclosure.

FIG. 3 illustrates a charging system according to various embodiments of the present disclosure.

Referring to FIG. 3, the charging system according to various embodiments of the present disclosure can include an external power supply 10, an inductor 20, a charging control module 30, a power control module 40, a battery 50, and a noise removal unit 60.

The external power supply 10 is a power supply source for charging the battery 50, and can be an external charging device, for example, a Travel Adaptor (TA), a Universal Serial Bus (USB) charger, a portable battery charger or the like.

The inductor 20 can store and release energy. For example, the inductor 20 can store energy during an on period of a switching cycle and release the stored energy during an off period.

The charging control module 30 can control a charging function of the battery 50 or an OTG function. The charging control module 30 can have a switching node voltage of 3 levels (0, Vin/2, and Vin) by using four switches and a flying capacitor. A "flying capacitor" can be used, for example, as a charge pump for storing energy to create either a higher or lower voltage power source.

The charging control module 30 can include a control circuit 310, a first switching element 320a, a second switching element 330a, a third switching element 330b, a fourth switching element 320b, a flying capacitor 340, and a battery switching element 350.

The control circuit 310 can sense an input voltage Vin, an input current Iin, a positive voltage Vfly+ of the flying capacitor, a negative voltage Vfly− of the flying capacitor, an output voltage Vo, a load current IL, a battery current Ibat, or a battery voltage Vbat and control on/off the first switching element 320a, the second switching element 330a, the third switching element 330b, the fourth switching element 320b, or the battery switching element 350, so as to charge the battery 50, and can transmit power to the power control module 40. Alternately, the control circuit 310 can control power of the battery 50 to be transmitted to the external power supply 10 (Vin).

The first switching element 320a, the second switching element 330a, the third switching element 330b, and the fourth switching element 320b can be turned on/off according to a switching cycle.

One side of the first switching element 320a can be connected to an input terminal into which the external power Vin is input in series, and one side of the second switching element 330a can be connected to the other side of the first switching element 320a in series. One side of the third switching element 330b can be connected to the other side of the second switching element 330a in parallel, one side of the fourth switching element 320b can be connected to the other side of the third switching element 330b in series, and the other side of the fourth switching element 320b can be grounded.

One side (anode) of the flying capacitor 340 can be connected between the first switching element 320a and the second switching element 330a, and the other side (cathode) of the flying capacitor 340 can be connected between the third switching element 330b and the fourth switching element 320b.

The battery switching element 350 can turn on/off the supply of charging current to the battery 50. For example, when the battery 50 is fully charged, the battery switching element 350 can be turned off so that the charging current is not supplied to the battery 50. When power of the battery 50 is below a predetermined level, the battery switching element 350 can be turned on to charge the battery 50. Alternately, the battery switching element 350 can be turned on to supply power of the battery 50 to an external storage device in an OTG mode (when an OTG function is activated). When a voltage of the battery 50 is low, for example, when a voltage of the battery 50 is equal to or lower than 3.6 V, the battery switching element 350 can operate in a linear area to supply a predetermined voltage to the power control module 40.

The power control module 40 can receive power from the battery 50 or the charging control module 30, and can supply the received power to respective components of the electronic device.

The battery 50 can store electricity and supply power to the components of the electronic device by using the stored electricity. Alternately, the battery 50 can supply power to an external storage device in the OTG mode. The battery 50 can include, for example, a rechargeable battery, a super capacitor, or a solar battery.

The noise removal unit 60 can remove noise included in the output power Vo of the charging control module 30. Although the noise removal unit 60 includes resistance R1 and a capacitor Co in FIG. 3, it is only an example and does not limit various embodiments of the present disclosure.

In the charging control module 30 having the above described configuration, a switching node voltage $V_{SWN}$ and an inductor voltage $V_{IND}$ applied to the inductor 20 in a charging mode can have one of the following values according to on/off conditions of the first switching element 320a to the fourth switching element 320b and the battery switching element 350.

1) 320a: on, 330a: on, 320b: off, 330b: off, 350: on;
   $V_{SWN}$=Vin, $V_{IND}$=Vin-VBAT
2) 320a: on, 330a: off, 320b: off, 330b: on, 350: on;
   $V_{SWN}$=Vin-VFLY, $V_{IND}$Vin-VFLY-VBAT
3) 320a: on, 330a: off, 320b off, 330b: off, 350: on;
   $V_{SWN}$=VBAT, $V_{IND}$=0
4) 320a: off, 330a: on, 320b: on, 330b: off, 350: on;
   $V_{SWN}$=VFLY, $V_{IND}$=VFLY-VBAT
5) 320a: off, 330a: on, 320b: off, 330b: off, 350: on;
   $V_{SWN}$=VBAT, $V_{IND}$=0
6) 320a: off, 330a: off, 320b: on, 330b: on, 350: on;
   $V_{SWN}$=0, $V_{IND}$=-VBAT
7) 320a: off, 330a: off, 320b: off, 330b: off, 350: on;
   $V_{SWN}$=VBAT, $V_{IND}$=0
8) 320a: on, 330a: on, 320b: off, 330b: off, 350: off;
   $V_{SWN}$=Vin, $V_{IND}$=Vin-Vo
9) 320a: on, 330a: off, 320b: off, 330b: on, 350: off;
   $V_{SWN}$=Vin-VFLY, V=Vin-VFLY-Vo
10) 320a: on, 330a: off, 320b: off, 330b: off, 350: off;
    $V_{SWN}$=Vo, $V_{IND}$=0
11) 320a: off, 330a: on, 320b: on, 330b: off, 350: off;
    $V_{SWN}$=VFLY, $V_{IND}$=VFLY-Vo
12) 320a: off, 330a: on, 320b: off, 330b: off, 350: off;
    $V_{SWN}$=Vo, $V_{IND}$=0
13) 320a: off, 330a: off, 320b: on, 330b: on, 350: off;
    $V_{SWN}$=0, $V_{IND}$=-Vo
14) 320a: off, 330a: off, 320b: off, 330b: off, 350: off;
    $V_{SWN}$=Vo, $V_{IND}$=0
15) 320a: on, 330a: on, 320b: off, 330b: off, 350: Linear;
    $V_{SWN}$=Vin, $V_{IND}$=Vin-Vo
16) 320a: on, 330a: off, 320b: off, 330b: on, 350: Linear;
    $V_{SWN}$=Vin-VFLY, $V_{IND}$=Vin-VFLY-Vo
17) 320a: on, 330a: off, 320b: off, 330b: off, 350 Linear;
    $V_{SWN}$=Vo, $V_{IND}$=0
18) 320a: off, 330a: on, 320b: on, 330b: off, 350: Linear;
    $V_{SWN}$=VFLY, $V_{IND}$=VFLY-Vo
19) 320a: off, 330a: on, 320b: off, 330b: off, 350: Linear;
    $V_{SWN}$=Vo, $V_{IND}$=0
20) 320a: off, 330a: off, 320b: on, 330b: on, 350: Linear;
    $V_{SWN}$=0, $V_{IND}$=-Vo
21) 320a: off, 330a: off, 320b: off, 330b: off, 350: Linear;
    $V_{SWN}$=Vo, $V_{IND}$=0

Since the battery switching element 350 is in an on state in the OTG mode, the charging control module 30 can operate with one switching node voltage $V_{SWN}$ and one inductor voltage $V_{IND}$ among NOs. 1) to 7).

For the voltage stabilization of the flying capacitor 340, in a normal state, the control circuit 310 according to various embodiments of the present disclosure can control switching node voltages of NOs. 2) and 4) to have the same number of times during one switching cycle when the battery switching element 350 is in an on state, control switching node voltages of NOs. 9) and 11) to have the same number of times during one switching cycle when the battery switching element 350 is in an off state, and control switching node voltages of NOs. 16) and 18) to have the same number of times when the battery switching element 350 is in a linear state.

For the charging or discharging of the flying capacitor 340, in a transient state, the control circuit 310 can control switching node voltages of NOs. 2) and 4) to have the same number of times during one switching cycle when the battery switching element 350 is in an on state, control switching node voltages of NOs. 9) and 11) to have the same number of times during one switching cycle when the battery switching element 350 is turned off, and control switching node voltages of NOs. 16) and 18) to have the same number of times when the battery switching element 350 is in a linear state.

For example, the control circuit 310 can provide a pulse wave having an opposite phase to on/off control terminals of the first switching element 320a and the second switching element 330a. Further, the control circuit 310 can complementarily control on/off of the first switching element 320a and the fourth switching element 320b, and on/off of the second switching element 330a and the third switching element 330b. A detailed description thereof will be made below with reference to FIG. 4.

Figure 4:
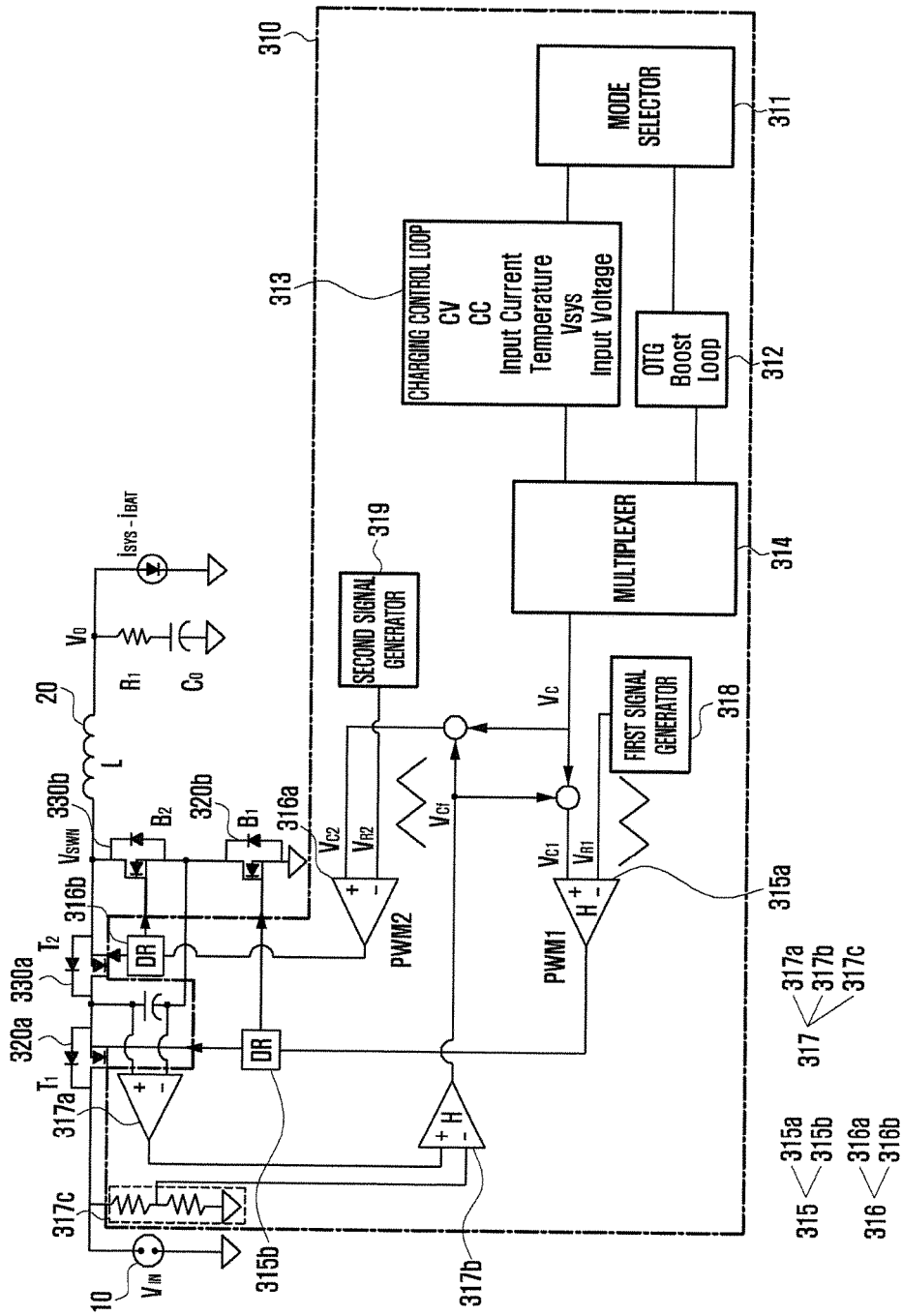
FIG. 4 illustrates a configuration of a control circuit of FIG. 3 according to various embodiments of the present disclosure.

FIG. 4 illustrates a configuration of the control circuit of FIG. 3 according to various embodiments of the present disclosure.

Referring to FIG. 4, the control circuit 310 according to various embodiments of the present disclosure can include a mode selector 311, an OTG boost loop 312, a charging control loop 313, a multiplexer 314, a first modulation circuit 315, a second modulation circuit 316, and a flying voltage control circuit 317.

The mode selector 311 can control the charging control module to operate in a charging mode or an OTG mode. For example, when a connection with an external charging device is detected, the mode selector 311 can activate the charging control loop 313. When a connection with an external storage device is detected, the mode selector 311 can activate the OTG boost loop 312.

The charging control loop 313 can control the charging mode of the charging control module 30. The charging control loop 313 can include a Constant Voltage (CV) charging control loop, a constant current charging control loop, an input current control loop, a temperature compensation loop, a system voltage (Vsys) control loop, and an input voltage control loop.

The OTG boost loop 312 can control the OTG mode of the charging control module 30.

The multiplexer 314 can select an input signal suitable for a condition from multiple input signals and output the selected input signal. For example, the multiplexer 314 can select the OTG boost loop 312 when the OTG mode is activated and select the charging control loop 313 when the charging mode is activated.

The first modulation circuit 315 can control on/off of the first switching element 320a and the fourth switching element 320b. The first modulation circuit 315 can include a first comparator 315a, a first gate driver 315b, and a first signal generator 318.

The first comparator 315a can compare a difference (Vc1=Vc−Vcf: charging mode) or a sum (Vc1=Vc+Vcf: OTG boost mode) between an output signal (Vc) of the multiplexer 314 and a feedback signal (an output signal (Vcf) of a fourth comparator 317b described below) input into a non-inverting terminal (+) with a pulse wave signal ($V_{R1}$) of a first phase input into an inverting input terminal (−). The pulse wave signal ($V_{R1}$) of the first phase is a dual-edge ramp signal having two slopes and can be supplied through the first signal generator 318.

The first gate driver 315b can receive an output signal of the first comparator 315a and control on/off of the first switching element 320a and the fourth switching element 320b. At this time, the first gate driver 315b can complementarily control on/off of the first switching element 320a and the fourth switching element 320b.

The second modulation circuit 316 can control on/off of the second switching element 330a and the third switching element 330b. The second modulation circuit 316 can include a second comparator 316a, a second gate driver 316b, and a second signal generator 319.

The second comparator 316a can compare a sum (Vc2=Vc+Vcf: charging mode) or difference (Vc2=Vc−Vcf: OTG boost mode) between an output signal (Vc) of the multiplexer 314 and a feedback signal (an output signal (Vcf) of a fourth comparator 317b described below) input into a non-inverting terminal (+) with a pulse wave signal ($V_{R2}$) of a second phase input into an inverting input terminal (−). The pulse wave signal ($V_{R2}$) of the second phase is a dual-edge ramp signal having two slopes and can be supplied through the second signal generator 319.

The second gate driver 316b can receive an output signal of the second comparator 316a and control on/off of the second switching element 330a and the third switching element 330b. At this time, the second gate driver 316b can complementarily control on/off of the second switching element 330a and the third switching element 330b.

The pulse wave signal ($V_{R1}$) input into the first comparator 315a and the pulse wave signal ($V_{R2}$) input into the second comparator 316a can have opposite phases (180 degrees) from each other.

The flying voltage control circuit 317 can control a voltage applied to the flying capacitor 340 to be half (Vin/2) of the external power. For example, when the voltage applied to the flying capacitor 340 exceeds ½ of the external power Vin, the flying voltage control circuit 317 can decrease an on duration of the first switching element 320a and increase an on duration of the second switching element 330a. At this time, the flying capacitor 340 can perform discharging longer than charging. In contrast, when the voltage applied to the flying capacitor 340 is below ½ of the external power Vin, the flying voltage control circuit 317 can increase an on duration of the first switching element 320a and decrease an on duration of the second switching element 330a. At this time, the flying capacitor 340 can perform charging longer than discharging.

The flying voltage control circuit 317 can include a third comparator 317a, a fourth comparator 317b, and a voltage dividing circuit 317c.

The third comparator 317a can compare a position voltage (+) and a negative voltage (−) of the flying capacitor 340. An output of the third comparator 317a can be input into a non-inverting input terminal (+) of the fourth comparator 317b.

The voltage dividing circuit 317c can divide the external power Vin in half. In the voltage dividing circuit 317c, two resistances having the same value can be connected in series. As the two resistances connected in series have the same resistance value, the external power can be divided in half. The divided voltage can be input into the inverting input terminal (−) of the fourth comparator 317b.

An output signal of the fourth comparator 317b can be connected to non-inverting input terminals of the first comparator 315a and the second comparator 316a to provide feedback.

Through the above described configuration, the voltage applied to the flying capacitor 340 is maintained as Vin/2 and the switching node voltage VSWN can be also maintained as Vin/2 in various embodiments of the present disclosure. As described above, as the switching node voltage VSWN is reduced to Vin/2, the size of the inductor 20 can be reduced to ¼ compared to a conventional charging circuit. As the voltages applied to switching elements, for example, the first switching element 320a to the fourth switching element 330b are reduced to Vin/2, a power loss can decrease and heating can decrease.

Figure 5:
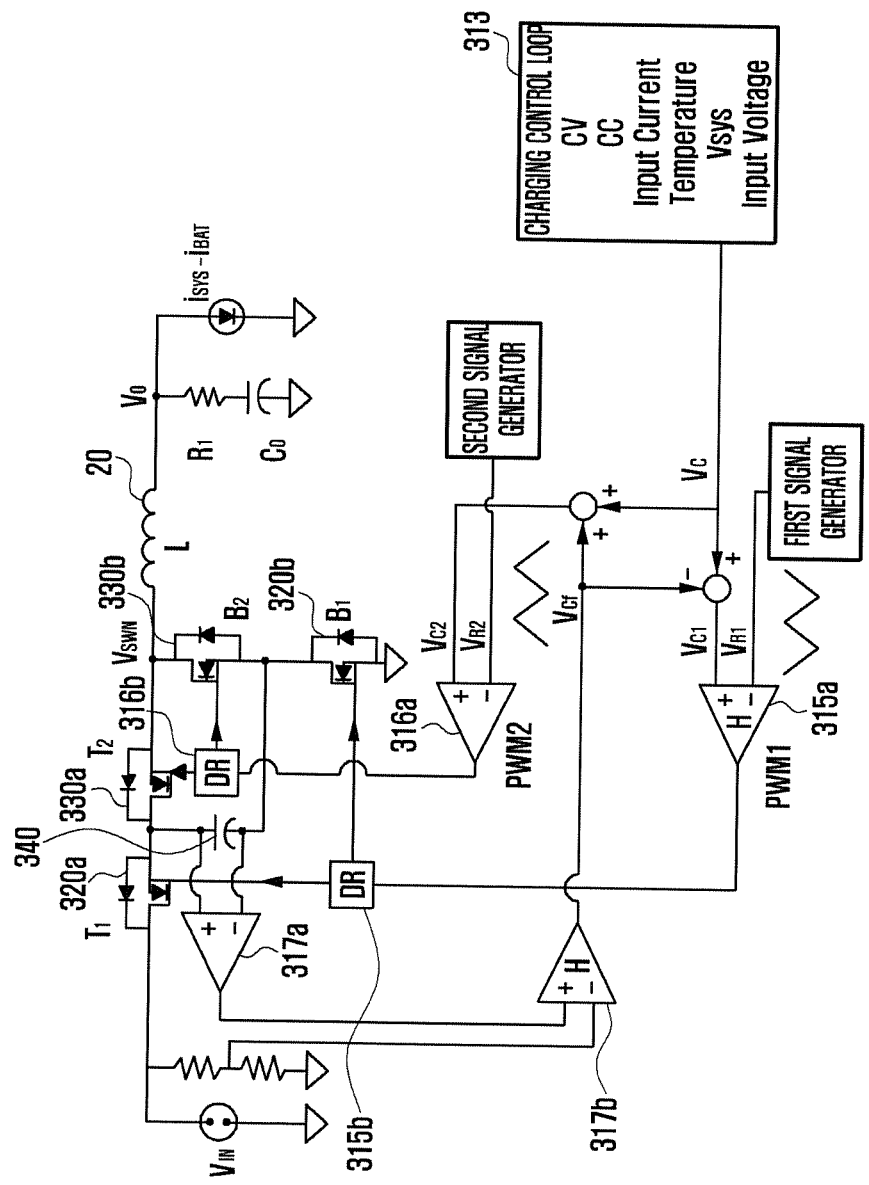
FIG. 5 illustrates an equivalent circuit of a charging circuit in a charging mode according to various embodiments of the present disclosure.

FIG. 5 illustrates an equivalent circuit of the charging circuit in the charging mode according to various embodiments of the present disclosure.

Referring to FIG. 5, when the charging mode is activated, for example, an external charging device is connected, the charging control loop 313 can provide control signals (Vc1 and Vc2) to non-inverting terminals (+) of the first comparator 315a and the second comparator 316a, respectively. On/off of the first switching element 320a to the fourth switching element 320b can be controlled by control signals Vc1 and Vc2.

For example, when the first switching element 320a and the second switching element 330a are turned on and when the fourth switching element 320b and the third switching 330b are turned off, the switching node voltage $V_{SWN}$ can become the voltage Vin of the external power supply. A voltage Vfly of the flying capacitor 340 may not be changed and the inductor 20 can be charged with Vin. At this time, since a sum of voltages applied to the third switching element 330b and the fourth switching element 320b is Vin, if parasitic impedances of the third switching element 330b and the fourth switching element 320b are the same, the voltages applied to the third switching element 330b and the fourth switching element 320b can be controlled to be Vin/2.

In another example, when the first switching element 320a is turned on, the second switching element 330a is turned off, the fourth switching element 320b is turned off, and the third switching 330b is turned on, the switching node voltage $V_{SWN}$ can become the flying capacitor voltage Vfly of the external power supply. At this time, the flying capacitor 340 can be charged with a load current $I_L$. The flying capacitor 340 and the inductor 20 together can be charged with the input voltage Vin. The voltage applied to the second switching element 330a can become the flying capacitor voltage Vfly, and the voltage applied to the fourth switching element 320b can become the voltage generated by subtracting the flying capacitor voltage Vfly from the input voltage Vin (input voltage Vin−flying capacitor voltage Vfly). When the flying capacitor voltage Vfly is controlled to be Vin/2, the voltages applied to the second switching element 330a and the fourth switching element 320b can be controlled to be Vin/2.

In another example, when the first switching element 320a is turned off, the second switching element 330a is turned on, the fourth switching element 320b is turned on, and the third switching 330b is turned off, the switching node voltage $V_{SWN}$ can become the flying capacitor voltage Vfly. At this time, the flying capacitor 340 can be discharged by a load current $I_L$. For example, energy stored in the flying capacitor 340 can be transmitted to the inductor 20 and can be output. The voltage generated by subtracting the flying capacitor voltage Vfly from the input voltage Vin (input voltage Vin–flying capacitor voltage Vfly) is applied to the first switching element 320a, and the flying capacitor voltage Vfly can be applied to the third switching element 330b. At this time, when the flying capacitor voltage Vfly is controlled to be Vin/2, the voltages applied to the first switching element 320a and the third switching element 330b can be controlled to be Vin/2.

In another example, when the first switching element 320a and the second switching element 330a are turned off and the fourth switching element 320b and the third switching element 330b are turned on, the switching node voltage $V_{SWN}$ can be the same as GND. At this time, the flying capacitor voltage Vfly may not be changed, and energy stored in the inductor 20 can be output. At this time, since a sum of the voltages applied to the first switching element 320a and the second switching element 330a is Vin, if parasitic impedances of the first switching element 320a and the second switching element 330a are the same, the voltages applied to the first switching element 320a and the second switching element 330a can be controlled to be Vin/2.

When the voltage applied to the flying capacitor 340 exceeds ½ of the external power Vin, an output of the fourth comparator 317b increases, and thus an on duration of the first switching element 320a can decrease and an on duration of the second switching element 330a can increase. At this time, the flying capacitor 340 can perform discharging longer than charging.

In contrast, when the voltage applied to the flying capacitor 340 is below ½ of the external power Vin, an output of the fourth comparator 317b decreases, and thus an on duration of the first switching element 320a can increase and an on duration of the second switching element 330a can decrease. At this time, the flying capacitor 340 can perform charging longer than discharging.

As described above, since the charging circuit according to various embodiments of the present disclosure has two switchings in which 1) Vin, 2) Vin–Vfly, Vfly, 3) Vin–Vfly, Vfly, and 4) GND are applied during one switching cycle, an effective switching frequency can be two times of the conventional charging circuit, for example, the charging circuit using a buck-converter. An output current of the charging circuit can be used for charging the battery 50 (for example, $i_{BAT}$) or provided to the power control module 40 (for example, $i_{SYS}$), and then provided to respective components of the electronic device.

Various embodiments of the present disclosure can easily implement the charging control loop by using the control signal (Vc) equally to a scheme used in the conventional charging circuit, for example, the buck-converter charging circuit.

Figure 6:
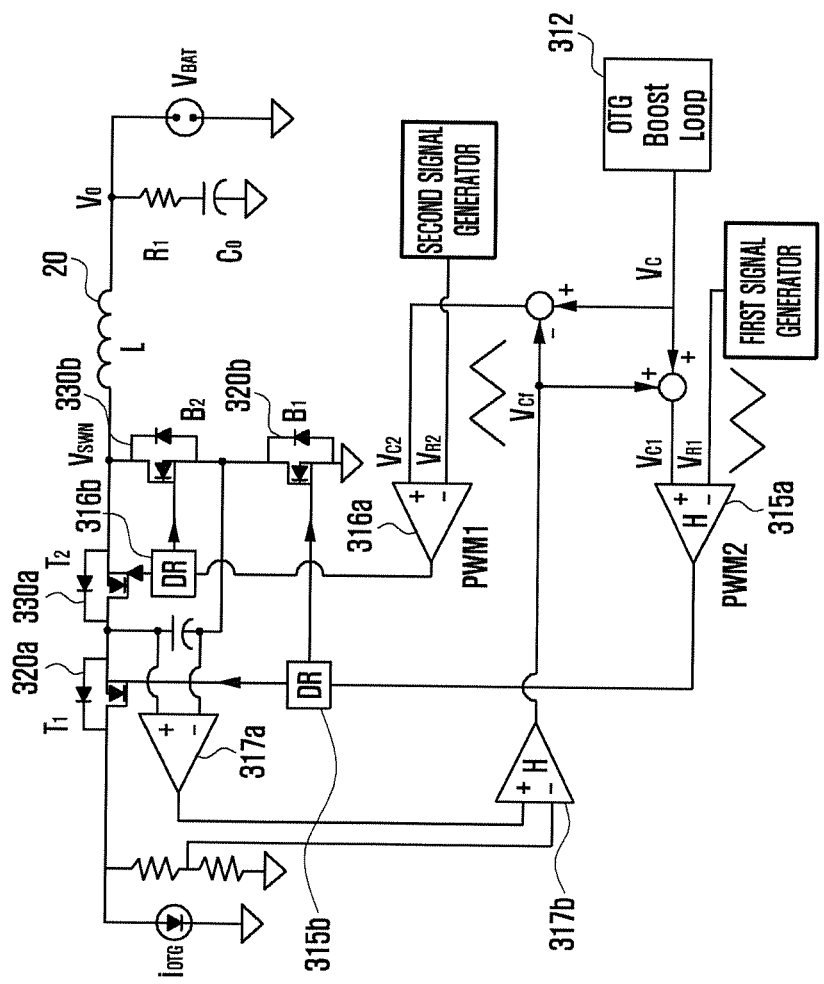
FIG. 6 illustrates an equivalent circuit of a charging circuit in an OTG mode according to various embodiments of the present disclosure.

FIG. 6 illustrates an equivalent circuit of the charging circuit in the OTG mode according to various embodiments of the present disclosure.

Referring to FIG. 6, when the OTG mode is activated, for example, an external storage device is connected, the OTG boost loop 312 can provide control signals (Vc1 and Vc2) to non-inverting terminals (+) of the first comparator 315a and the second comparator 316a. On/off of the first switching element 320a to the fourth switching element 320b can be controlled by the control signals Vc1 and Vc2.

For example, when the first switching element 320a and the second switching element 330a are turned on and the fourth switching element 320b and the third switching 330b are turned off, the switching node voltage VSWN can become the voltage Vin of the external power supply. The voltage Vfly of the flying capacitor 340 may not be changed to the voltage Vin of the external power, and energy stored in the inductor 20 can be charged with Vin–Vbat. At this time, since a sum of voltages applied to the third switching element 330b and the fourth switching element 320b is Vin, if parasitic impedances of the third switching element 330b and the fourth switching element 320b are the same, the voltages applied to the third switching element 330b and the fourth switching element 320b can be controlled to be Vin/2.

In another example, when the first switching element 320a is turned on, the second switching element 330a is turned off, the fourth switching element 320b is turned off, and the third switching 330b is turned on, the switching node voltage $V_{SWN}$ can become the flying capacitor voltage Vfly of the external power. At this time, the flying capacitor 340 can be discharged by a load current $I_L$. The flying capacitor 340 and the inductor 20 can be discharged together. The voltage applied to the second switching element 330a can become the flying capacitor voltage Vfly, and the voltage applied to the fourth switching element 320b can become the voltage generated by subtracting the flying capacitor voltage Vfly from the input voltage Vin (input voltage Vin–flying capacitor voltage Vfly). When the flying capacitor voltage Vfly is controlled to be Vin/2, the voltages applied to the second switching element 330a and the fourth switching element 320b can be controlled to be Vin/2.

In another example, when the first switching element 320a is turned off, the second switching element 330a is turned on, the fourth switching element 320b is turned on, and the third switching 330b is turned off, the switching node voltage $V_{SWN}$ can become the flying capacitor voltage Vfly. At this time, the inductor 20 and the flying capacitor 340 can be charged. The voltage generated by subtracting the flying capacitor voltage Vfly from the input voltage Vin (input voltage Vin–flying capacitor voltage Vfly) is applied to the first switching element 320a, and the flying capacitor voltage Vfly can be applied to the third switching element 330b. At this time, when the flying capacitor voltage Vfly is controlled to be Vin/2, the voltages applied to the first switching element 320a and the third switching element 330b can be controlled to be Vin/2.

In another example, when the first switching element 320a and the second switching element 330a are turned off and the fourth switching element 320b and the third switching element 330b are turned on, the switching node voltage $V_{SWN}$ can be the same as GND. At this time, the flying capacitor voltage Vfly may not be changed, and energy can be charged (stored) in the inductor 20. At this time, since a sum of the voltages applied to the first switching element 320a and the second switching element 330a is Vin, if parasitic impedances of the first switching element 320a and the second switching element 330a are the same, the voltages applied to the first switching element 320a and the second switching element 330a can be controlled to be Vin/2.

When the voltage applied to the flying capacitor 340 exceeds ½ of the external power Vin, an output of the fourth comparator 317b increases, and thus an on duration of the first switching element 320a can increase and an on duration of the second switching element 330a can decrease. At this time, the flying capacitor 340 can perform discharging longer than charging.

In contrast, when the voltage applied to the flying capacitor 340 is below ½ of the external power Vin, an output of the fourth comparator 317b decreases, and thus an on duration of the first switching element 320a can decrease and an on duration of the second switching element 330a can increase. At this time, the flying capacitor 340 can perform charging longer than discharging.

As described above, since the charging circuit according to various embodiments of the present disclosure has two switchings in which 1) Vin, 2) Vin−Vfly, Vfly, 3) Vin−Vfly, Vfly, and 4) GND are applied during one switching cycle, an effective switching frequency can be two times that of the conventional charging circuit, for example, the charging circuit using a buck-converter.

A current ($i_{OTG}$) boosted by the charging circuit can be provided to an external storage device and thus an OTG function can be used.

Various embodiments of the present disclosure can easily implement the OTG boost loop by using the control signal (Vc) equally to a scheme used in the conventional charging circuit, for example, the buck-converter charging circuit.

According to various embodiments, at least part of a device (for example, modules or functions thereof) or a method (for example, operations) according to the various embodiments of the present disclosure can be embodied by, for example, an instruction stored in a computer readable storage medium provided in a form of a programming module. When the command is executed by one or more processors (for example, the processor 210), the one or more processors can execute a function corresponding to the command. The computer-readable storage medium can be, for example, the memory 220. At least a part of the programming module can be implemented (for example, executed) by, for example, the processor 210. At least some of the programming modules can include, for example, a module, a program, a routine, a set of instructions or a process for performing one or more functions.

The computer-readable recording medium can include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (for example, programming module), such as a Read Only Memory (ROM), a Random Access Memory (RAM), a flash memory and the like. In addition, the program instructions can include high class language codes, which can be executed in a computer by using an interpreter, as well as machine codes made by a compiler. The aforementioned hardware device can be configured to operate as one or more software modules in order to perform the operation of various embodiments of the present disclosure, and vice versa.

A module or a programming module according to the present disclosure can include at least one of the described component elements, a few of the component elements can be omitted, or additional component elements can be included. Operations executed by a module, a programming module, or other component elements according to various embodiments of the present disclosure can be executed sequentially, in parallel, repeatedly, or in a heuristic manner. Further, some operations can be executed according to another order or may be omitted, or other operations may be added.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A charging circuit for charging a battery of an electronic device, the charging circuit comprising:
   a first switching element having one side connected to an interface into which external power is input;
   a second switching element having one side connected serially to another side of the first switching element;
   a third switching element having one side connected to another side of the second switching element;
   a fourth switching element having one side connected serially to another side of the third switching element;
   a flying capacitor located between the other side of the first switching element and the other side of the third switching element;
   an inductor having one side connected to a node between the second switching element and the third switching element, another side of the inductor being connected to a battery switching element; and
   a control circuit configured to:
      control a charging function of the battery by controlling on/off of the first switching element, the second switching element, the third switching element and the fourth switching element;
      control a voltage applied to the flying capacitor to be one-half (½) of an input voltage inputted to the first switching element; and
      control at least two voltages applied to the first switching element, the second switching element, the third switching element, and the fourth switching element to be ½ of the input voltage,
   wherein the control circuit is further configured to control a switching node voltage applied to the node connected to the inductor to maintain at ½ of the input voltage.

2. The charging circuit of claim 1, further comprising the battery switching element located between the other side of the inductor and the battery, wherein the control circuit is configured to control the charging function or an on the go (OTG) function by further controlling the battery switching element.

3. The charging circuit of claim 1, wherein the control circuit comprises:
   a first modulation circuit configured to control on/off of the first switching element and the fourth switching element; and
   a second modulation circuit configured to control on/off of the second switching element and the third switching element.

4. The charging circuit of claim 3, wherein the first modulation circuit comprises:
   a first signal generator configured to output a pulse wave signal of a first phase;
   a first comparator configured to compare a signal of a difference or a sum of a control signal and a feedback signal with the pulse wave signal of the first phase; and
   a first gate driver configured to control on/off of the first switching element and the fourth switching element according to an output signal of the first comparator, and the second modulation circuit comprises:

a second signal generator configured to output a pulse wave signal of a second phase having an opposite phase of the first phase;

a second comparator configured to compare a signal of a difference or a sum of a control signal and a feedback signal with the pulse wave signal of the second phase; and a second gate driver configured to control on/off of the second switching element and the third switching element according to an output signal of the second comparator.

5. The charging circuit of claim 4, wherein the first gate driver is configured to complementarily control the first switching element and the fourth switching element and the second gate driver is configured to complementarily control the second switching element and the third switching element.

6. The charging circuit of claim 4, wherein the pulse wave signal of the first phase and the pulse wave signal of the second phase are dual-edge ramp signals.

7. The charging circuit of claim 1, further comprising a flying voltage control circuit configured to decrease an on duration of the first switching element and increases an on duration of the second switching element when the voltage applied to the flying capacitor is larger than one half (½) of the external power.

8. The charging circuit of claim 1, further comprising a flying voltage control circuit configured to increase an on duration of the first switching element and decrease an on duration of the second switching element when the voltage applied to the flying capacitor is smaller than one half (½) of the external power.

9. The charging circuit of claim 1, further comprising a flying voltage control circuit comprising:
a third comparator configured to compare a positive voltage and a negative voltage of the flying capacitor;
a voltage dividing circuit configured to divide the external power in half; and
a fourth comparator configured to compare an output of the third comparator and an output of the voltage dividing circuit,
wherein an output of the fourth comparator is fed back to non-inverting input terminals of a first comparator and a second comparator.

10. The charging circuit of claim 9, further comprising the flying voltage control circuit configured to provide a negative feedback to the first comparator and a positive feedback to the second comparator in a charging mode.

11. The charging circuit of claim 9, further comprising the flying voltage control circuit configured to provide a positive feedback to the first comparator and negative feedback to the second comparator in an OTG mode.

12. An electronic device comprising:
a battery;
a charging circuit configured to charge the battery, wherein the charging circuit comprises:
a first switching element having one side connected to an interface into which external power is input;
a second switching element having one side connected serially to another side of the first switching element;
a third switching element having one side connected to another side of the second switching element;
a fourth switching element having one side connected serially to another side of the third switching element;

a flying capacitor located between the other side of the first switching element and the other side of the third switching element;
an inductor having one side connected to a node between the second switching element and the third switching element, another side of the inductor being connected to a battery switching element; and
a control circuit configured to:
control a charging function of the battery by controlling on/off of the first switching element, the second switching element, the third switching element and the fourth switching element;
control a voltage applied to the flying capacitor to be one-half (½) of an input voltage inputted to the first switching element; and
control at least two voltages applied to the first switching element, the second switching element, the third switching element, and the fourth switching element to be ½ of the input voltage,
wherein the control circuit is further configured to control a switching node voltage applied to the node connected to the inductor to maintain at ½ of the input voltage, and wherein the switching node voltage is maintained at ½ of the input voltage.

13. The electronic device of claim 12, further comprising the battery switching element located between the other side of the inductor and the battery, wherein the control circuit is configured to control the charging function or an on the go (OTG) function by further controlling the battery switching element.

14. The electronic device of claim 12, wherein the control circuit comprises:
a first modulation circuit configured to control on/off of the first switching element and the fourth switching element; and
a second modulation circuit configured to control on/off of the second switching element and the third switching element.

15. The electronic device of claim 14, wherein the first modulation circuit comprises:
a first signal generator configured to output a pulse wave signal of a first phase;
a first comparator configured to compare a signal of a difference or a sum of a control signal and a feedback signal with the pulse wave signal of the first phase; and
a first gate driver configured to control on/off of the first switching element and the fourth switching element according to an output signal of the first comparator, and
the second modulation circuit comprises:
a second signal generator configured to output a pulse wave signal of a second phase having an opposite phase of the first phase;
a second comparator configured to compare a signal of a difference or a sum of a control signal and a feedback signal with the pulse wave signal of the second phase; and
a second gate driver configured to control on/off of the second switching element and the third switching element according to an output signal of the second comparator.

16. The electronic device of claim 15, wherein the first gate driver is configured to complementarily control the first switching element and the fourth switching element and the second gate driver is configured to complementarily control the second switching element and the third switching element.

17. The electronic device of claim 15, wherein the pulse wave signal of the first phase and the pulse wave signal of the second phase are dual-edge ramp signals.

18. The electronic device of claim 12, further comprising a flying voltage control circuit configured to control a voltage applied to the flying capacitor to be one half (½) of an input voltage.

19. The electronic device of claim 18, wherein the flying voltage control circuit is configured to:
  decrease an on duration of the first switching element and increases an on duration of the second switching element when the voltage applied to the flying capacitor is larger than one half (½) of the external power; and
  increase an on duration of the first switching element and decrease an on duration of the second switching element when the voltage applied to the flying capacitor is smaller than one half (½) of the external power.

\* \* \* \* \*